(12) United States Patent
Clark et al.

(10) Patent No.: US 9,738,431 B2
(45) Date of Patent: Aug. 22, 2017

(54) INSULATED STORAGE CASE FOR ELECTRONIC EQUIPMENT

(71) Applicants: Michael Clark, Colt, AR (US); Kyle Clark, Colt, AR (US)

(72) Inventors: Michael Clark, Colt, AR (US); Kyle Clark, Colt, AR (US)

( * ) Notice: Subject to any disclaimer, the term of this patent is extended or adjusted under 35 U.S.C. 154(b) by 114 days.

(21) Appl. No.: 14/827,502

(22) Filed: Aug. 17, 2015

(65) Prior Publication Data
US 2017/0050794 A1 Feb. 23, 2017

(51) Int. Cl.
*B65D 81/38* (2006.01)
*A45C 11/00* (2006.01)
*G06F 1/16* (2006.01)

(52) U.S. Cl.
CPC .............. *B65D 81/38* (2013.01); *A45C 11/00* (2013.01); *G06F 1/1626* (2013.01); *A45C 2011/002* (2013.01); *A45C 2011/003* (2013.01)

(58) Field of Classification Search
CPC .... A45C 3/00; A45C 3/02; A45C 7/00; A45C 13/02; A45C 13/10; A45C 11/00; A45C 13/021; A45C 2011/002; A45C 2011/003; B65D 81/02; B65D 85/00; B65D 85/30; B65D 90/22; B65D 81/38; G06F 1/1626
USPC ....... 206/305, 320, 521, 523, 583, 591–594; 190/100–127
See application file for complete search history.

(56) References Cited

U.S. PATENT DOCUMENTS

| | | | |
|---|---|---|---|
| 5,010,988 A * | 4/1991 | Brown | A45C 3/00 190/104 |
| 5,494,157 A * | 2/1996 | Golenz | A45C 3/02 190/111 |
| 5,570,780 A * | 11/1996 | Miller | A45C 13/021 206/305 |
| 5,782,370 A | 7/1998 | Kamiya | |
| 6,646,864 B2 * | 11/2003 | Richardson | G06F 1/1626 206/305 |
| 7,293,649 B2 * | 11/2007 | Gelphman | A45C 13/02 190/124 |
| 8,219,167 B2 | 7/2012 | Hsiao | |
| 8,269,104 B2 | 9/2012 | Choraku et al. | |
| 8,544,670 B2 * | 10/2013 | Brilmyer | G11B 33/1406 109/33 |
| 8,668,113 B2 | 3/2014 | Hsu | |
| 8,706,176 B1 | 4/2014 | Jia et al. | |
| 8,995,127 B2 | 3/2015 | Richardson | |
| 9,578,942 B2 * | 2/2017 | Brilmyer | A45C 11/00 |
| 2011/0272305 A1 * | 11/2011 | Lee | A45C 5/03 206/320 |
| 2014/0091007 A1 * | 4/2014 | Garside | A47D 5/006 206/320 |

* cited by examiner

Primary Examiner — Bryon Gehman
(74) Attorney, Agent, or Firm — David J Kreher

(57) ABSTRACT

A storage case for electronic devices such as cell phones or laptop computers that is fully insulated to protect the electronic device contained within the storage device from long term (several hours) exposure to heat or cold.

4 Claims, 5 Drawing Sheets

INSULATED STORAGE CASE FOR ELECTRONIC EQUIPMENT

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC

Not Applicable

DESCRIPTION

Field of the Invention

The present disclosure reveals a storage case for electronic devices that is insulated so that the electronic device stored within the storage case is not harmed by long term exposure to heat or cold such as within a car, on a beach, or while camping. In addition, the storage case may contain a collection of connections for the electronic devices stored within the storage case to facilitate charging and communication while the device is within the storage case.

Background of the Invention

It is known that electronic devices are susceptible to exposure to heat and cold because heat and cold impact the electronics and the charge held by the battery. Specifically, a cell phone or computer left in a car during a hot summer day for an extended period of time may be unusable thereafter. Similar conditions may exist at the beach, while camping, or during other outdoor summer or winter activities. To date, an invention has not been revealed that protects electronic devices such as cell phones and laptop computers from this exposure.

In http://saltcases.com, Salt Case Company reveals a storage container for electronic devices that protects against heat of cold, however, as revealed, the cases disclosed by Salt Case Company are not fully enclosed so as to protect against long term (several hours) of exposure to heat or cold.

SUMMARY OF THE INVENTION

A storage case for electronic devices to protect the electronic devices contained therein against long term exposure the heat or cold such as when a cell phone of laptop is left in a car for an afternoon during the middle of the summer. Said storage case may also have features such as connection means to allow the stored electronic device to be charged while stored, to connect the output to the exterior of the case, may also be waterproof and air tight.

AMENDED BRIEF DESCRIPTION OF THE SEVERAL VIEWS OF THE DRAWING

Figure 1:
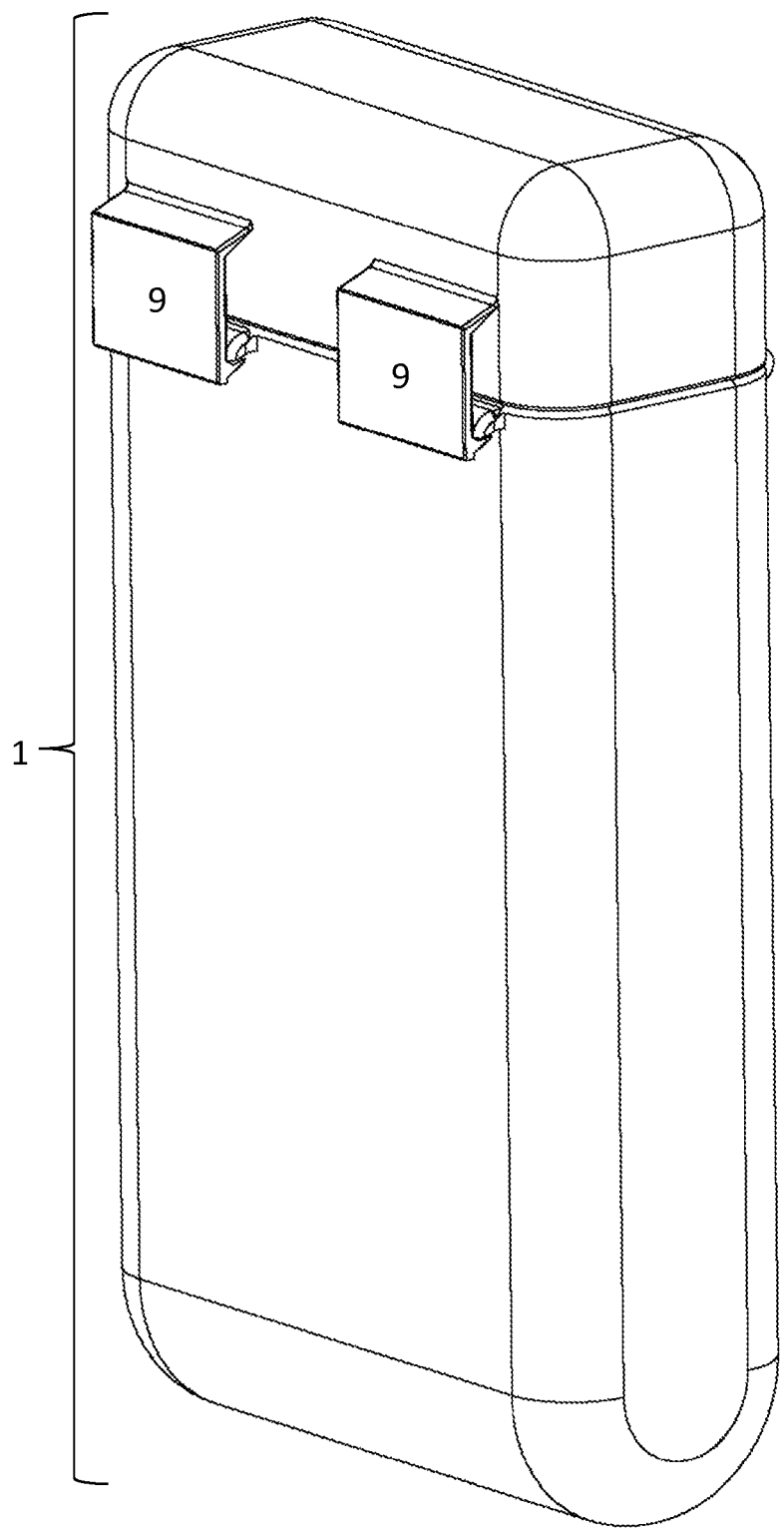
FIG. 1 is a display of the storage case showing the upper and lower shells of the storage case with the case closed.
Figure 2:
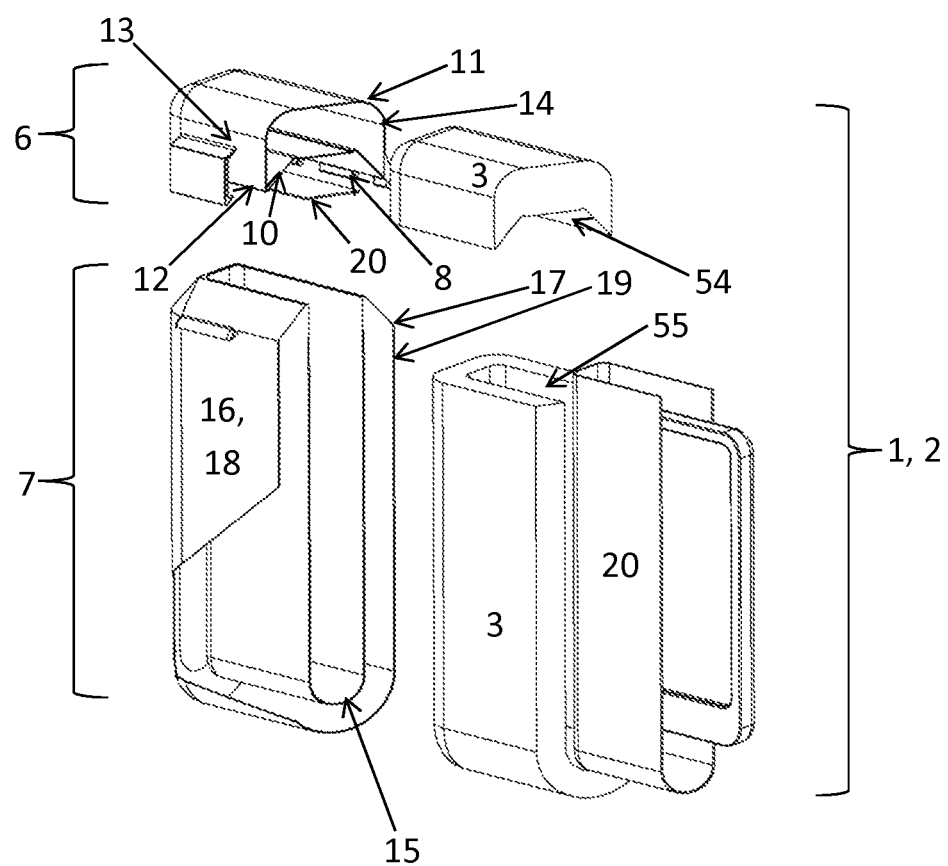
FIG. 2 is a display of the first embodiment of the storage case showing the upper portion of the storage case including the interior, insulation, exterior, front and back and the lower portion of the storage case including the interior, insulation, exterior, front and back.
Figure 3:
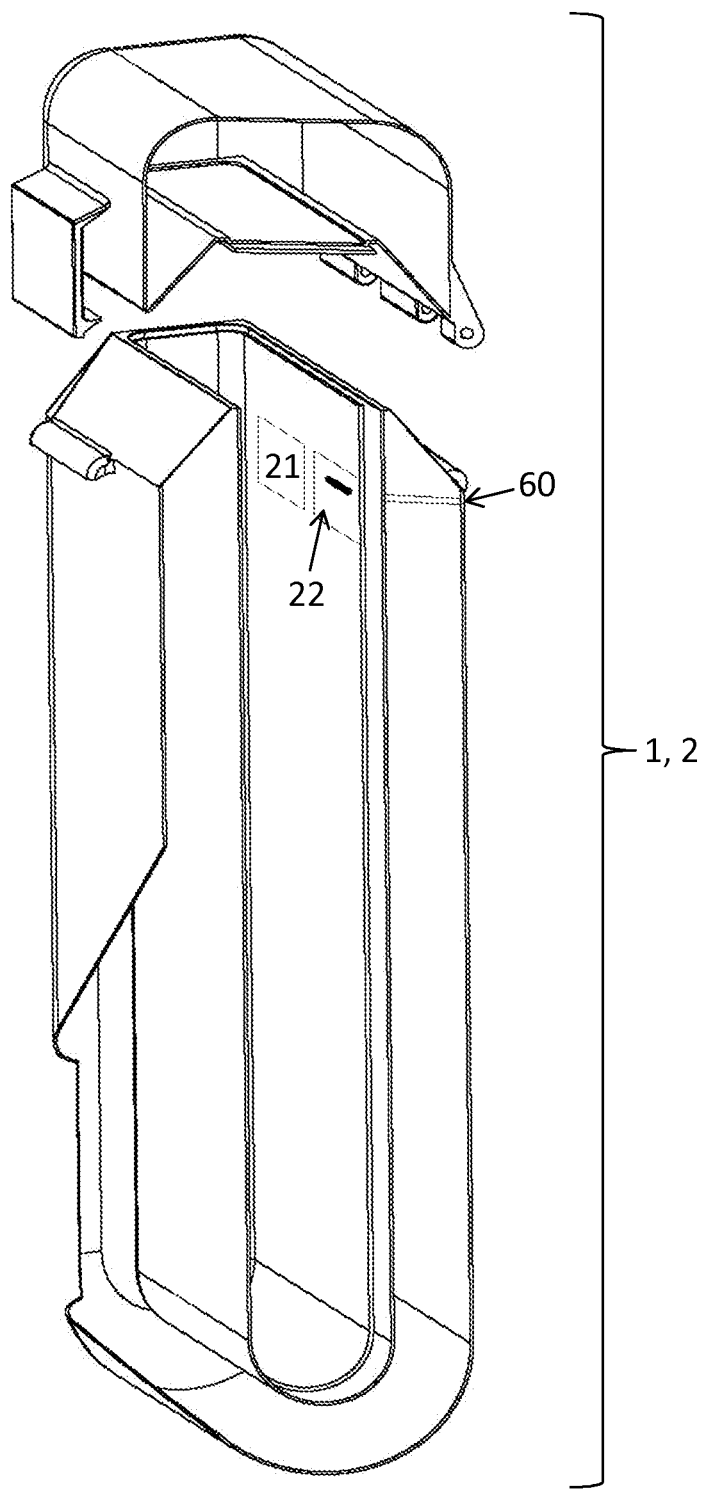
FIG. 3 is a display of the first embodiment of the storage case showing the interior of the lower portion including the layer of material that covers the insulation and an indication of the plurality of electronic connections.
Figure 4:
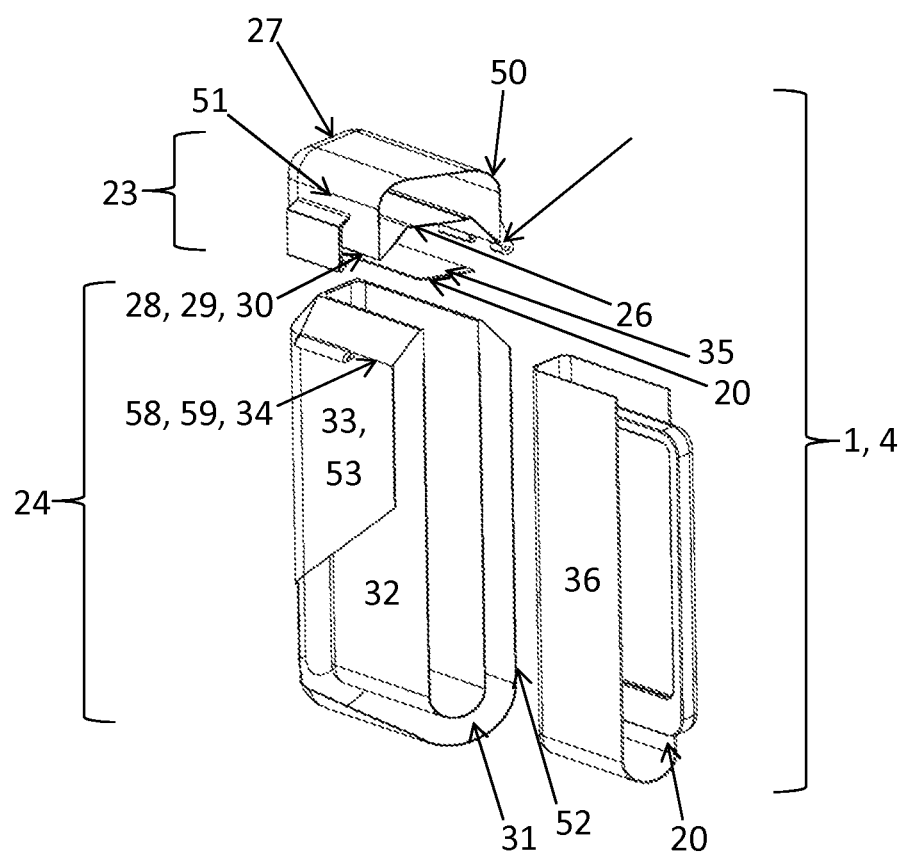
Figure 5:
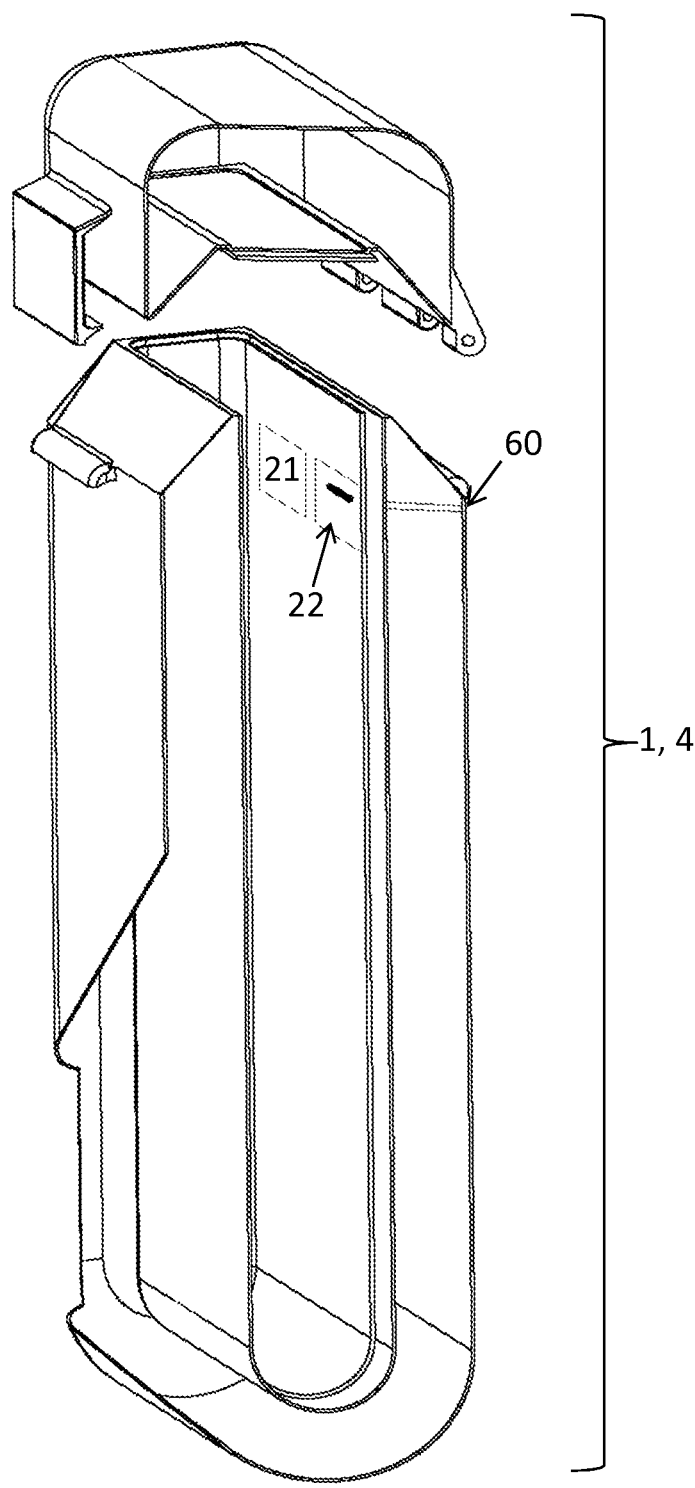

FIG. 4 is a display of the second embodiment of the storage case showing the upper portion of the storage case including the inner wall and outer wall and the space between the inner wall and outer wall interior, insulation, exterior, front and back as well as the lower portion of the storage case including the inner wall and outer wall and the space between the inner wall and outer wall, interior, insulation, exterior, front and back; and FIG. 5 is a display of the second embodiment of the storage case showing the interior of the lower portion including the layer of material that covers the insulation and an indication of the plurality of electronic connections.

AMENDED DETAILED DESCRIPTION OF THE INVENTION

A storage case 1 for electronic equipment such as lap tops and cell phones to prevent exposure to temperature extremes of heat and cold in environments such as the interior of an automobile, the beach, camping, or other outdoor activities. There are two embodiments of the storage case 1, the first embodiment 2 uses insulation 3 to minimize exposure to the extreme temperatures by preventing the heat from being conducted into the storage case 1. The second embodiment 4 uses a vacuum insulated double walled 5 for minimizing exposure to the extreme temperatures, thus inhibiting the transfer of heat by eliminating a medium through which the heat can be conducted.

The first embodiment 2 of the storage case 1 comprises an upper portion 6 and a lower portion 7, a plurality of hinges 8 and a plurality of clasps 9. The upper portion 6 comprises an interior 10, an exterior 11, a contact edge 12, a front side 13, and a back side 14. The lower portion 7 comprises an interior 15, an exterior 16, a contact edge 17, a front side 18, and a back side 19. The interior 10 of the upper portion 6 and lower portion 7 is insulated with an insulation 3 wherein the material that makes up said insulation could be polystyrene, polyisocyanurate, polyurethane, perlite, cork, foam, or other insulating medium. The insulation 3 of the upper portion 6 and the insulation 3 lower portion 7 are formed to cover the interior portion 10 of the upper portion 6 and interior portion 15 of the lower portion 7, while supplying protection against heat or cold, while also leaving room to fit the electronic equipment.

The contact edge 12 of the upper portion 6 is shaped to match the contact edge 17 of the lower portion 7 such that when the contact edge 12 of the upper portion 6 connects with the contact edge 17 of the lower portion 7 the storage case 1 is closed and sealed such that the storage case 1 may be air and water tight. The upper portion 6 and the lower portion 7 are attached together by the plurality of hinges 8 along the back side 14 of the upper portion 6 and the along the back side 19 of the lower portion 7. The plurality of hinges 8 facilitate the opening and closing of the storage case 1. The upper portion 6 and the lower portion 7 are latched together by the plurality of clasps 9 along the front side 13 of the upper portion 6 and along the front side 18 of the lower portion 7.

There is a surface 54 of the insulation 3 for the upper portion 6 and a surface 55 of the insulation 3 for the lower portion 7. The surfaces 54, 55 of the insulation 3 of the upper portion 6 and lower portion 7 that is opposite the interior 10 of the upper portion 6 or the interior 15 of the lower portion 7 are covered with a layer of material 20 such as vinyl, leather, or cloth. The layer of material 20 of the upper portion 6 and the layer of material 20 of the lower portion 7 may comprise a plurality of compartments 21 for storing items. Within at least one of the plurality of compartments 21 in the upper portion or the plurality of compartments 21 in the lower portion 7 may be a plurality of electronic connections 22 wherein the electronic connections 22 comprises at least one of a backup battery, a charger with an external connection 60, or an audio connection with external connection 60.

The plurality of clasps 9 could be at least one of Velcro attachments, snaps, latches, locks, turn locks, drop locks, flap locks, catches, draw bolts, box latches, trunk locks, catches, zippers, or buckles.

In the second embodiment 4 of the storage case 1, the upper portion 23 of the storage case 1 and lower portion 24 of the storage case 1 are double walled 5. The upper portion 23 comprises an inner wall 26, an outer wall 27, a back side 50, and a front side 51, where the inner wall 26 comprises a perimeter edge 28 and the outer wall 27 comprises a perimeter edge 29 and the perimeter walls 28 29 join to form a contact edge 30. There is also a gap 31 between the inner wall 26 and outer wall 27 except along the contact edge 30.

The lower portion 24 comprises an inner wall 32, an outer wall 33, a back side 52 and a front side 53, where the inner wall 32 comprises a perimeter edge 58 and the outer wall 33 comprises a perimeter edge 59 and the perimeter walls 58, 59 join to form a contact edge 34. There is also a gap 31 between the inner wall 32 and outer wall 33 except along the contact edge 34.

The upper portion 23 and lower portion 24 are sealed sufficiently around the respective contact edges 30, 34 to allow for a vacuum to be created between inner wall 26 and the outer wall 27 of the upper portion 23 and the inner wall 32 and outer wall 33 of the lower portion 24.

The inner wall 26 of the upper portion 23 comprises an inside surface 35 and the inner wall 32 of the lower portion 24 has an inside surface 36 wherein both inside surfaces 35, 36 combine to comprise the interior of the storage case 1. Both inside surfaces 35, 36 are also covered with a layer of insulation 3 wherein the material that makes up said insulation 3 could be polystyrene, polyisocyanurate, polyurethane, perlite, cork, foam, or other insulating material to cushion the electronic device contained within the storage case. The insulation 3 of the upper portion 23 and the insulation 3 lower portion 24 are formed to cover the inside surface 35 of the upper portion 23 and the inside surface 36 of the lower portion 24, while supplying cushioning to the electronic equipment as well as additional protection against heat or cold, while also leaving room to fit the electronic equipment.

The contact edge 30 of the upper portion 23 is shaped to match the contact edge 34 of the lower portion 24 such that when the contact edge 30 of the upper portion 23 connects with the contact edge 34 of the lower portion 24 the storage case 1 is closed and sealed such that the storage case 1 may be air and water tight. The upper portion 23 and the lower portion 24 are attached together by the plurality of hinges 8 along the back side 50 of the upper portion 23 and the back side 52 of the lower portion 24. The plurality of hinges 8 facilitate the opening and closing of the storage case 1. The upper portion 23 and the lower portion 24 are latched together by the plurality of clasps 9 along the front side 51 of the upper portion 23 and along the front side 53 of the lower portion 24.

There is a surface 56 of insulation 3 for the upper portion 23 and a surface 57 of the insulation 3 for the lower portion 24 that act as padding. The surfaces 56, 57 of the insulation 3 of the upper portion 23 and lower portion 24 that is opposite the inside surface 35 of the upper portion 23 or the inside surface 36 of the lower portion 24 are covered with a layer of material 20 such as vinyl, leather, or cloth. The layer of material 20 of the upper portion 23 and the layer of material 20 of the lower portion 24 may have a plurality of compartments 21 for storing items. Within at least one of the plurality of compartments 21 in the upper portion 23 or lower portion 24 may be a plurality of electronic connections 22 wherein the electronic connections 22 comprise at least one of a backup battery, a charger with an external connection 60, or an audio connection with external connection 60.

The plurality of clasps 9 could be at least one of Velcro attachments, snaps, latches, locks, turn locks, drop locks, flap locks, catches, draw bolts, box latches, trunk locks, catches, zippers, or buckles.

What is claimed:

1. A storage case for electronic equipment to prevent exposure to temperature extremes of heat and cold in environments comprising:

an upper portion and a lower portion, a plurality of hinges and a plurality of clasps;

the upper portion comprises an interior, an exterior, a contact edge, a front side and a back side;

the lower portion comprises an interior, an exterior, a contact edge, a front side and a back side;

the entire interior of the upper portion is insulated with an insulation;

the entire interior of the lower portion is insulated with an insulation;

the insulation of the upper portion is formed to cover the interior portion of the upper portion, supplying protection against heat or cold, while also leaving room to fit the electronic equipment;

the insulation of the lower portion is formed to cover the interior portion of the lower portion, supplying protection against heat or cold, while also leaving room to fit the electronic equipment;

the upper portion and the lower portion are attached together by the plurality of hinges along the back side of the upper portion and the back side of the lower portion;

the plurality of hinges facilitate the opening and closing of the storage case;

the contact edge of the upper portion is shaped to match the contact edge of the lower portion;

the upper portion and the lower portion are latched together by the plurality of clasps along front side of the upper portion and the front side of the lower portion;

wherein the portion of the insulation of the upper portion that is opposite the interior of the upper portion is covered with a layer of material;

wherein the portion of the insulation of the lower portion that is opposite the interior of the lower portion is covered with a layer of material;

wherein the layer of material of the upper portion has a plurality of compartments for storing items;

wherein the layer of material of the lower portion has a plurality of compartments for storing items; and wherein within the plurality of compartments in the upper portion or lower portion are a plurality of electronic connections wherein the electronic connections comprise at least one of a backup battery, a charger with an external connection, or an audio connection with external connection.

2. The storage case of claim 1 wherein the contact edge of the upper portion is shaped to match the contact edge of the lower portion such that when the contact edge of the upper portion connects with the contact edge of the lower portion the storage case is air and water tight.

3. A storage case for electronic equipment to prevent exposure to temperature extremes of heat and cold in environments such as comprising:
- an upper portion and a lower portion, a plurality of hinges and a plurality of clasps;
- the upper portion comprises an inner wall, an outer wall, a perimeter edge of the inner wall, a perimeter edge of the outer wall, a contact edge, an inside surface, a back side and a front side;
- the perimeter edge of the inner wall and the perimeter edge of the outer wall of the upper portion are formed to create the contact edge of the upper portion, and the inner wall and outer wall are arranged so that there is space between the inner wall and the outer wall and the inner wall and outer wall are joined at the contact edge so as to allow a vacuum to be formed in the space between the inner layer and outer layer;
- the lower portion comprises an inner wall, an outer wall, a perimeter edge of the inner wall, a perimeter edge of the outer wall, a contact edge, an inside surface, a back side and a front side;
- the perimeter edge of the inner wall and the perimeter edge of the outer wall of the lower portion are formed to create the contact edge of the upper portion, and the inner wall and outer wall are arranged so that there is space between the inner wall and the outer wall and the inner wall and outer wall are joined at the contact edge so as to allow a vacuum to be formed in the space between the inner layer and outer layer;
- the inner wall of the upper portion further comprises an inner surface;
- the inner surface of the upper portion is covered with a layer of insulation;
- the insulation of the upper portion is formed to cover the interior portion of the upper portion while supplying cushioning to the electronic equipment as well as protection against heat or cold, while also leaving room to fit the electronic equipment;
- the inner wall of the lower portion further comprises an inner surface;
- the inner surface of the lower portion is covered with a layer of insulation;
- the insulation of the lower portion is formed to cover the interior portion of the lower portion while supplying cushioning to the electronic equipment as well as protection against heat or cold, while also leaving room to fit the electronic equipment;
- the plurality of hinges facilitate the opening and closing of the storage case;
- the contact edge of the upper portion is shaped to match the contact edge of the lower portion;
- the upper portion and the lower portion are latched together by the plurality of clasps on the front side of the upper portion and the front side of the lower portion;
- wherein the portion of the insulation of the upper portion that is opposite the interior of the upper portion is covered with a layer of material;
- wherein the portion of the insulation of the lower portion that is opposite the interior of the lower portion is covered with a layer of material;
- wherein the layer of material of the upper portion has a plurality of compartments for storing items;
- wherein the layer of material of the lower portion has a plurality of compartments for storing items; and
- wherein within the plurality of compartments in the upper portion or lower portion are a plurality of electronic connections wherein the electronic connections comprises at least one of a backup battery, a charger with an external connection, or an audio connection with external connection.

4. The storage case of claim 3 wherein the contact edge of the upper portion is shaped to match the contact edge of the lower portion such that when the contact edge of the upper portion connects with the contact edge of the lower portion the storage case is air and water tight.

* * * * *